March 1, 1960

V. H. NAFIUS

MEANS FOR POSITIONING AND PROTECTING A MAGNETIC HEAD OF A MAGNETIC RECORDER 2,926,982

Filed July 1, 1955

2 Sheets-Sheet 1

VERNER H. NAFIUS
INVENTOR.

BY [signature]
ATTORNEY

March 1, 1960

V. H. NAFIUS 2,926,982

MEANS FOR POSITIONING AND PROTECTING A MAGNETIC HEAD OF A MAGNETIC RECORDER

Filed July 1, 1955

2 Sheets-Sheet 2

VERNER H. NAFIUS
INVENTOR.

BY [signature]
ATTORNEY 2,926,982
Patented Mar. 1, 1960

2,926,982

MEANS FOR POSITIONING AND PROTECTING A MAGNETIC HEAD OF A MAGNETIC RECORDER

Verner H. Nafius, Los Angeles, Calif., assignor to Techno Instrument Company, Los Angeles, Calif., a co-partnership consisting of E. R. Chilcott and Doris C. Chilcott Application July 1, 1955, Serial No. 519,483

9 Claims. (Cl. 346—74)

This invention relates to magnetic recorders and reproducing devices in which a movable support carries a magnetic recording sheet past a magnetic head and the invention is directed to means for the dual purpose of protecting the head from wear by the traveling recording sheet and for maintaining predetermined spacing between the head and the recording sheet.

While the invention is widely applicable for its purpose, it is being initially incorporated in a multiple-channel magnetic recorder of the type set forth in the copending Cunningham application Serial No. 292,104 entitled Multiple-Channel Magnetic Recorder," now Patent No. 2,806,757 granted September 17, 1957, which disclosure is hereby incorporated in the present disclosure by reference.

In an apparatus of this type, a traveling recording sheet of magnetic material is carried by a movable support means in a path adjacent a magnetic head, which head functions both to record signals on the sheet and to reproduce such recorded signals. One problem in the operation of such an apparatus is to maintain constant spacing between the magnetic head and the traveling recording sheet. Substantially constant spacing is essential because any variation in such spacing affects the signals that are being recorded or reproduced. A second problem to which the invention is directed is the minimizing of wear on the magnetic head arising from frictional contact with the traveling recording sheet.

The present invention meets both of these problems by interposing a smooth stationary spacer sheet of non-magnetic material between the magnetic head and the traveling recording sheet. With the magnetic head resting against the smooth spacer sheet and pressing both the spacer sheet and the underlying recording sheet towards the surface of the underlying movable support means that carries the recording sheet, the interposed spacer sheet maintains the magnetic head at constant spacing relative to the recorded sheet and at the same time protects the magnetic head from wear by the travel of the recording sheet.

A spacer sheet for this purpose should meet certain requirements. In the first place the material of the sheet must be such that the interposition of the sheet between the magnetic head and the traveling recording sheet will result in low or negligible reduction in the magnetic coupling of the head with the recording sheet. Any such loss must be of insignificant magnitude since it occurs twice, first in making a record and second in reproducing the record. In the second place the spacer sheet must be of such character as to have a low coefficient of friction with respect to the underlying surface of the traveling recording sheet. Usually a substantial area of the stationary spacer sheet is in contact with the traveling recording sheet. In the third place the spacer sheet should be of adequate tensile strength since it is anchored in its stationary position and acts in tension to resist the friction of the underlying traveling recording sheet. In the fourth place the spacer sheet should be of accurately predetermined thickness and should be uniformly of that thickness.

In the presently preferred practice of the invention these requirements are met by using a spacer sheet made of polyester, preferably a polyester film available under the trade name Mylar. It has been found that a sheet of this material having a thickness of the order of magnitude of .0005 to .001 inch incurs an acceptably low loss in magnetic coupling and has adequate tensile strength for the present purpose. This material has a low coefficient of friction with respect to the usual recording sheet and is available in sheets of uniform thickness. In the preferred practice of the invention it is contemplated that the spacer sheet will be replaced periodically and it has been found that a spacer sheet of the selected material will maintain substantially constant thickness throughout a service period of satisfactory length so that only infrequent replacement of the spacer sheet is required.

An important object of the preferred practice of the invention is to provide an arrangement that effectively anchors the spacer sheet against movement caused by frictional constant with the underlying recording sheet and at the same time simplifies the procedure of replacing the spacer sheet when required. In this regard a feature of the invention is the concept of providing a reserve supply of the spacer sheet material in a suitable supply magazine with the spacer sheet extending from the supply magazine to the zone of operation of the magnetic head. Thus replenishment or replacement of the spacer sheet at the operating zone merely requires that the spacer sheet be advanced from the magazine sufficiently to place new material at the operating zone. After the spacer sheet has been advanced for replacement in this manner, the newly advanced used end portion of the spacer sheet may be severed and discarded.

A further object of the preferred practice of the invention is to provide a magazine arrangement that will releasably hold the spacer sheet stationary until it is desired to advance the sheet for replenishment in the operating zone. Preferably this object is attained by provisions for frictionally retaining the engagement sheet in a yielding manner, the frictional engagement being to withstand normal operating forces that tend to advance the sheet but, nevertheless, permitting the sheet to be advanced manually whenever desired. As will be explained, one of the features of the invention in this regard is a magazine arrangement wherein the weight of the reserve sheet supply itself against a support surface in the magazine creates sufficient friction to provide a substantial part for the desired resistance creepage of the sheet.

The various objects, features and advantages of the invention will be apparent from the following detailed description taken with the accompanying drawings.

In the drawings, which are to be regarded as merely illustrative:

Figure 1:
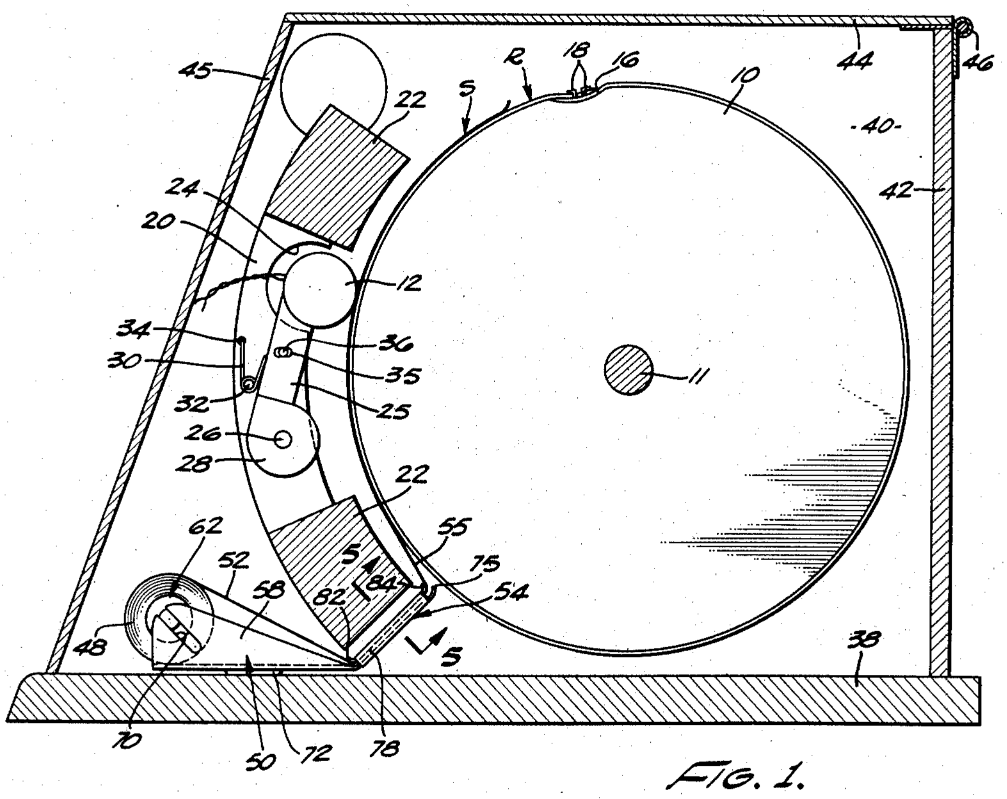
Fig. 1 is a simplified sectional view of the presently preferred embodiment of the invention.
Figure 2:
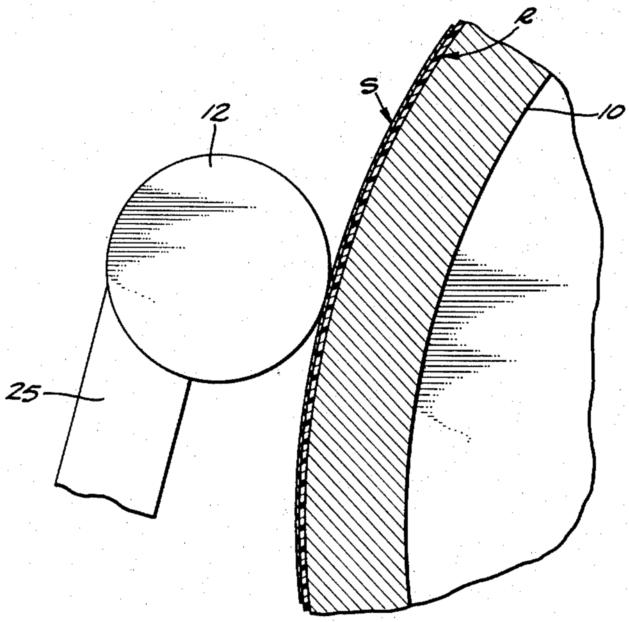
Fig. 2 is a greatly enlarged fragmentary view of a portion of the structure shown in Fig. 1.
Figure 3:
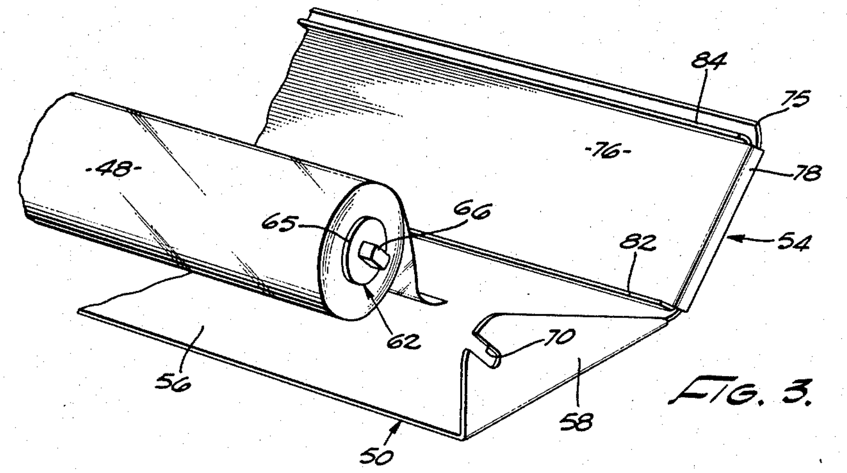
Fig. 3 is a fragmentary perspective view of the supply magazine showing a supply roll of the spacer film positioned for mounting in the magazine.
Figure 4:
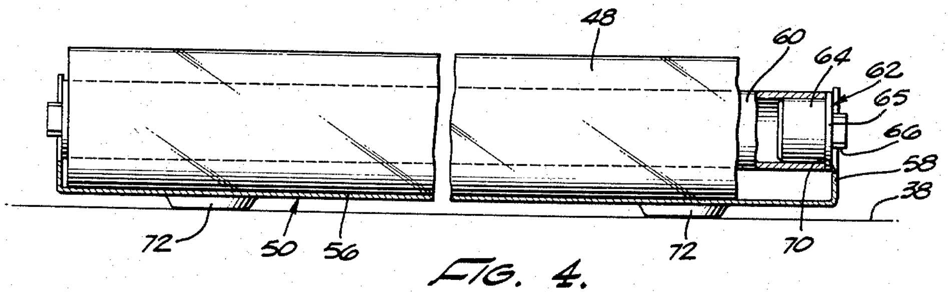
Fig. 4 is an elevation of the magazine and an associated spacer sheet guide with parts broken away to reveal concealed structure.

The particular structure shown in the drawings is part of a multiple-channel recorder for making a plurality of synchronous records on a single recording medium from a plurality of signal sources. The apparatus is adapted specifically for a geophysical exploration procedure wherein the seismic waves created by an explosion are recorded at multiple points for subsequent study and analysis.

The apparatus includes a rotary drum or cylinder 10 that is actuated to guide a suitable recording medium in the form of a flexible sheet, generally designated R, in a curved path of travel through an operating zone. In the operating zone a plurality of magnetic heads 12 function either to record signals on the recording sheet or to reproduce signals previously recorded thereon. The recording sheet R in this instance is of the same construction as a conventional magnetic tape.

For a relatively long operating period the rotary drum 10 may serve merely as a drive roller to actuate a recording sheet in the form of a relatively long belt. For the present purpose of geophysical exploration, however, the rotary drum 10 is employed as a sheet-holding means. The maximum operating period required for recording seismic waves in geophysical exploration is less than 6 seconds and a rotary drum having a diameter of approximately 7½ inches and operating at a peripheral speed of 3½ inches per second, makes one complete revolution in less than 6 seconds. In the present embodiment of the invention, the recording sheet R is wide enough to record as many as 48 signals simultaneously with an apparatus approximately only 12 inches in width.

As disclosed in detail in the above-mentioned copending application the rotary drum 10 has a transverse peripheral groove 16 in which the two opposite ends of the recording sheet R overlap and are secured. The two ends of the sheet R have overlapping slots and each pair of overlapping slots is engaged by the ends of a corresponding pair of fingers 18 carried by the drum, these fingers being adapted to spread apart for the purpose of placing the sheet under circumferential tension.

The magnetic heads 12, which are of the ring type, are specially designed for compactness in axial dimension and are closely spaced in a row across the periphery of the rotary drum 10. In this instance the magnetic heads 12 are mounted on holders 20, respectively, the holders being relatively thin blade members of arcuate curvature as shown. These holder blades 20 are mounted for circumferential adjustment on a pair of transverse supports 22. To accommodate the magnetic heads 12 within the space limitations the holder blades 20 are cut away at their inner edges to provide ample recesses 24.

The magnetic heads 12 are mounted on the corresponding holder blades 20 in any suitable manner that permits movement of the heads toward the rotary drum. For this purpose each of the magnetic heads 12 may be mounted on a thin arm 25 that extends between two of the holder blades, the arm being pivotally mounted on the corresponding holder blade by a suitable pivot stud 26. In the region of the pivot stud 26 the arm 25 is formed with an ample bearing portion 28 that is in intimate sliding contact with the face of the holder blade, the purpose of such construction being to hold the magnetic head 12 accurately to a predetermined arc of movement relative to the rotary drum.

Preferably each of the magnetic heads 12 is urged toward the rotary drum 10 and for this purpose each of the holder blades 20 may carry a light spring 30 to apply continuous pressure to the corresponding head-supporting arm 25. The spring 30 is made of suitably tempered wire and is wound around a stud 32 on the holder blade with one arm of the spring seated in a bore 34 in the holder blade and with the other arm of the spring pressing against the corresponding head-supporting arm 25.

It is contemplated that each magnetic head 12 will have freedom for a range of movement sufficient to permit the head to press against the periphery of the rotary drum but that the range of movement will be limited to keep the head from moving into the transverse groove 16 so that the magnetic head will not strike the sheet-tensioning fingers 18 in the groove. For the purpose of limiting the range of movement of the magnetic head 12, the thin arm 25 that carries the head may be formed with a small arcuate slot 35 and a suitable pin 36 may be mounted on the holder blade 20 in a position to extend through this slot. Thus the end of the slot 35 engages the pin 26 to stop the inward movement of the magnetic head whenever the magnetic head tends to enter the transverse drum groove 16.

The rotary drum 10 together with the plurality of magnetic heads 12 and the associated structure are enclosed by a suitable housing on a base plate 38. The housing includes a pair of side walls 40 and a back wall 42 extending upward from the base plate 38. The top wall 44 of the housing and an inclined front wall 45 united therewith serve as a cover, this cover being attached to the back wall 42 by a suitable hinge 46. The front wall 45 incorporates a window made of transparent material for observing operation of the apparatus.

In accord with the present invention, a spacer sheet, generally designated S, extends through the operating zone between the row of magnetic heads 12 and the recording sheet R on the periphery of the drum 10. While the spacer sheet S may be anchored in position in the operating zone for this purpose in any suitable manner, preferably the spacer sheet in the operating zone is merely the end portion of a relatively long sheet, the major portion of the sheet being held in reserve in a suitable supply magazine.

As best shown in Fig. 1 the reserve supply of the spacer sheet S may be in the form of a roll 48 carried by a magazine that is generally designated by numeral 50. A portion 52 of the spacer sheet extends from the roll 48 to a guide means that is generally designated by numeral 54. From the guide means 54 an end portion 55 of the spacer sheet extends upward along the periphery of the drum 10 to overlie the recording sheet R in the operating zone.

It is apparent that with the spacer sheet S pressed against the recording sheet R by the plurality of magnetic heads 12 there will be a tendency for the spacer sheet to be driven frictionally by the travel of the underlying recording sheet R. It is contemplated that the spacer sheet will be suitably anchored in opposition to this tendency.

Any suitable anchorage arrangement may be employed for this purpose. A feature of the present practice of the invention, however, is that the magazine 50 and the guide means 54 are so constructed as to provide inherently sufficient frictional resistance to keep the spacer sheet S from being shifted by travel of the recording sheet R. The degree of frictional resistance is sufficient for the purpose of normally maintaining the spacer sheet S stationary but nevertheless permits the spacer sheet to be advanced by manual force in a convenient manner whenever desired.

In the construction shown in the drawings the magazine 50 comprises a piece of sheet metal bent to form a bottom wall 56 and two upstanding wings 58, these wings being at the opposite ends of the reserve roll 48. The reserve roll 48 is wound on a roller in the form of a plain cylinder 60 and this cylinder 60 is provided with two end plugs 62 for engagement with the two magazine wings 58. Each of the end plugs 62 has a cylindrical portion 64 that slidingly telescopes into the end of the cylinder 60 and also has a radial flange 65 to abut the end of the cylinder. The outer end of each of the plugs 62 is formed with a projection or lug 66 that is of elongated configuration with two parallel side faces 68. The two lugs 66 at the end of the cylinder 64 extend in a sliding and non-rotary manner into corresponding inclined slots 70 in the magazine wings 58.

Figure 5:
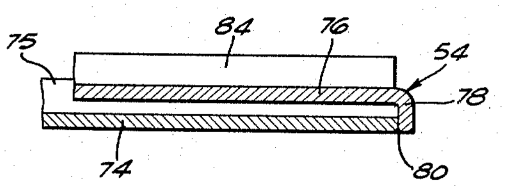
Fig. 5 is an enlarged fragmentary sectional view of a portion of the spacer sheet guide taken on the line 5—5 of Fig. 1.
Figure 6:
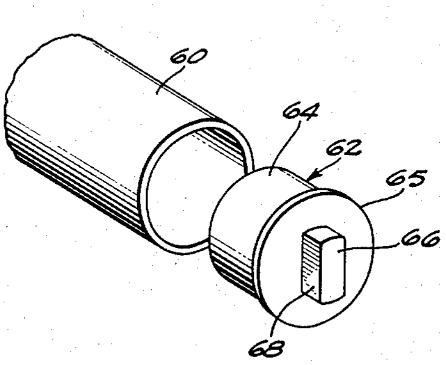
Fig. 6 is an enlarged fragmentary perspective view of a roller structure that is used to carry the reserve supply of the spacer sheet in the magazine.

The bottom wall 56 of the magazine 50 is formed with downwardly extending bosses 72 by means of which the magazine is mounted on the base plate 38 of the housing. The inclined guide means 54 has a bottom wall 74 integral with the magazine bottom wall 56 and this bottom wall of the guide means is preferably formed with an upwardly extending lip 75. The guide means 54 has a top wall 76 that is spaced above its bottom wall 74 to form a laterally extensive guide slot for the spacer sheet. As shown in Fig. 5 the top wall 76 of the guide means may be formed with downwardly extending end flanges 78 which are bonded to the bottom wall 74 of the guide means by welding or brazing as indicated at 80. For smooth contact with the spacer sheet S at its two changes in direction the top wall 76 of the guide means is formed with rounded lips 82 and 84.

It is apparent that the described arrangement provides frictional resistance in a number of ways to maintain the spacer sheet S stationary during normal operation of the apparatus. In the first place, since the two end plugs 62 are held against rotation by engagement of the lugs 66 with the corresponding slots 70 of the magazine wings 58, the plugs provide frictional resistance to rotation of the cylinder 60 on which the spacer sheet is wound. In the second place, the inclination of the two slots 70 permits the roll 48 of the spacer sheet to rest on the bottom wall 56 of the magazine to provide frictional resistance to rotation of the roll. In the third place, the engagement of the spacer sheet with the guide means 54 for two changes in direction of the spacer sheet provides frictional resistance to creepage of the spacer sheet into the operating zone.

As heretofore indicated the spacer sheet S is preferably a polyester film. In the initial practice of the invention the thickness of the spacer sheet is .001 inch but this thickness may be reduced to .0005 inch, for example, if desired. The spacer sheet has a smooth surface that develops an exceedingly low coefficient of friction with respect to the exposed surface of the underlying recording sheet R. The only wear on the magnetic head 12 is that occasioned by periodic advance of the spacer sheet and it is obvious that such wear is insignificant and imperceptible.

The replacement sheet S in the operating zone is periodically replaced as may be found necessary. Replacement is relatively infrequent since the spacer sheet in the operating zone will not deteriorate to an unacceptable extent over a period of eight hours of continual operation of the apparatus. Whenever replacement of the spacer sheet in the operating zone is desired, it is a simple matter to grasp the exposed end of the sheet and pull on the sheet to draw a fresh portion into the operating zone. The used end portion of the spacer sheet is then cut off and discarded.

My description in specific detail of a selected practice of the invention by way of example and to illustrate the principles involved will suggest various changes, substitutions and other departures from my disclosure that properly lie within the spirit and scope of the appended claims.

I claim:

1. In a magnetic recording and reproducing apparatus, the combination of: a movable support means to carry a recording sheet of magnetic material in a path of travel through an operating zone; a smooth pliable spacer sheet of non-magnetic material; means to anchor said spacer sheet at a region spaced from said path; guide means positioned adjacent said path of travel for engagement by said spacer sheet to provide a change in the direction in which the spacer sheet extends, with a portion of the sheet extending from said anchor means to the guide means and a portion extending from the guide means to said operating zone, said last portion extending adjacent said path of travel to overlie the traveling recording sheet; and at least one magnetic head resting on said spacer sheet in said operating zone whereby the spacer sheet protects the head from wear by the traveling recording sheet and determines the spacing of the head from the recording sheet.

2. A combination as set forth in claim 1 which includes yielding means to press said head tightly against said spacer sheet thereby to compact the spacer sheet and the recording sheet against said movable support means.

3. A combination as set forth in claim 1 in which said movable support means is a rotary drum with a transverse groove in its periphery; in which the two ends of said recording sheet are both attached to said drum in said groove; and which includes means to limit the range of movement of the magnetic head toward said drum thereby to prevent the magnetic head from entering said groove.

4. In a magnetic recording and reproducing apparatus, the combination of: a movable support means to carry a recording sheet of magnetic material in a path of travel through an operating zone, a supply magazine; a smooth spacer sheet of non-magnetic material extending from said supply magazine through said operating zone to overlie the traveling recording sheet in the operating zone, a reserve portion of said spacer sheet being carried by said magazine, said spacer sheet being normally anchored and being releasable for periodic replacement advancement to said operating zone; and at least one magnetic head resting on said spacer sheet in said operating zone whereby the spacer sheet protects the head from wear by the traveling recording sheet and determines the spacing of the head from the recording sheet.

5. A combination as set forth in claim 4 which includes guide means positioned adjacent said path of travel for engagement by said spacer sheet to provide a change in the direction in which the spacer sheet extends, said change of direction directing the sheet into said operative zone.

6. A combination as set forth in claim 5 in which said reserve portion of the spacer sheet is in the form of a roll in said magazine; and in which said magazine provides yielding resistance to unrolling of the spacer sheet whereby the spacer sheet is normally held stationary but may be manually drawn from the magazine in opposition to the yielding resistance for replacement in the said operating zone.

7. A combination as set forth in claim 6 in which said magazine includes a roller on which said reserve part of the spacer sheet is rolled; and which includes means to frictionally resist rotation of said roller.

8. A combination as set forth in claim 4 in which said reserve portion of the spacer sheet is in the form of a roll, said roll resting on a surface of said magazine and being restrained against rolling along said surface whereby frictional contact of the spacer sheet with said surface yieldingly resists withdrawal of the sheet from the magazine.

9. In magnetic recording and reproducing apparatus, the combination comprising: a cylindrical magnetic drum recorder including a drum having a ferromagnetic record thereon and at least one magnetic head having resilient means to hold it in pressure contact with said record at a predetermined position around said drum; a smooth, flexible spacer sheet of non-magnetic material extending partially around said drum; and means to anchor at least one end of said sheet at a position around said drum different from said predetermined position, said anchor means being constructed and positioned to cause said sheet to lie in cylindrical conformal contact with said record between said record and said magnetic head everywhere in proximity to said head, whereby the spacer sheet protects the head from wear by the traveling recording sheet and determines the spacing of the head from the recording sheet.

References Cited in the file of this patent

UNITED STATES PATENTS

| | | |
|---|---|---|
| 1,256,130 | Heitman | Feb. 12, 1918 |
| 2,356,999 | Hogan | Aug. 29, 1944 |
| 2,585,932 | Hare | Feb. 19, 1952 |
| 2,612,566 | Anderson et al. | Sept. 30, 1952 |

UNITED STATES PATENT OFFICE

CERTIFICATE OF CORRECTION

Patent No. 2,926,982 March 1, 1960

Verner H. Nafius

It is hereby certified that error appears in the printed specification of the above numbered patent requiring correction and that the said Letters Patent should read as corrected below.

Column 2, line 27, for "constant" read -- contact --; column 6, line 29, for "zone," read -- zone; --.

Signed and sealed this 6th day of September 1960.

(SEAL)
Attest:

ERNEST W. SWIDER
Attesting Officer

ROBERT C. WATSON
Commissioner of Patents